United States Patent Office 3,652,532
Patented Mar. 28, 1972

3,652,532
CATIONIC AZO DYES CONTAINING AMMONIUM SALTS
John Blackwell, Kennett Square, Pa., assignor to E. I. du Pont de Nemours and Company, Wilmington, Del.
No Drawing. Filed Jan. 27, 1969, Ser. No. 794,407
Int. Cl. C09b 29/10
U.S. Cl. 260—187
6 Claims

ABSTRACT OF THE DISCLOSURE

Cationic dyes based on (4-hydroxy-1-naphthacyl) ammonium salts and having the structure:

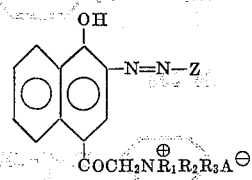

where $R_1$ is alkyl; $R_2$ and $R_3$ are independently alkyl or hydroxyalkyl, or together form an alicyclic ring; $A^\ominus$ is an anion; Z is a group of a diazo compound of the carbocyclic or heterocyclic aromatic series, free of sulfonic and carboxylic acid groups. In addition, the coupler utilized in the preparation of these dyes and having the structure:

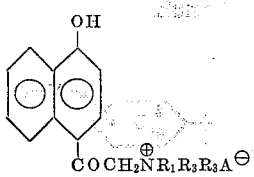

where $R_1$ is alkyl; $R_2$ and $R_3$ are independently alkyl or hydroxyalkyl, or together form an alicyclic ring; and A is an anion, is included in the invention.

BACKGROUND OF THE INVENTION

(1) Field of the invention

This invention relates to novel orange to violet cationic azo dyes based on (4-hydroxy-1-naphthacyl) ammonium salts, which may be used to dye acid modified synthetic fibers and are particularly useful on acrylic fiber, having in general bright shades and good fastness to light on this fiber.

(2) Description of the prior art

While cationic dyes such as those described in U.S. Pats. 2,821,526, 3,020,272, 3,074,926 and 3,119,810, which are prepared by coupling an amine of the formula

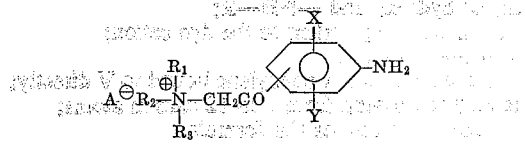

where
X and Y are various substituents, such as chlorine and bromine
$R_1$ is alkyl
$R_2$ is alkyl or hydroxyalkyl
$R_3$ is alkyl, hydroxyalkyl or benzyl or $R_1$, $R_2$ and $R_3$ together form a pyridine ring
$A^\ominus$ is an anion, to various couplers such as pyrazolone compounds, are presently being used in dyeing acid modified acrylic and polyester fibers, the development and expansion in use of fiber blends have broadened the demands on cationic dyes.

"Crossdyed" effects in these blends, whereby one type of fiber present is dyed while another remains unstained produce desirable multicolored effects. The desire to obtain these multicolored blends makes it necessary that a cationic dye now be capable of imparting a high degree of light-fastness on several different acid-modified fibers such as acrylic, nylon, and polyester fibers, and yet produce a minimum of stain on other fibers used in the blends such as cotton, wool and unmodified nylon and polyester. Such a combination of properties is difficult to obtain in a cationic dye.

The novel cationic dyes of this invention possess these desired properties and consequently are useful for the coloration of acid modified synthetic fibers, particularly acrylic fiber, and blends. Each dye has a high degree of lightfastness on one or more acid-modified fibers and many have good reserve on such fibers as cotton, wool and unmodified nylon and polyester.

SUMMARY OF THE INVENTION

The present invention comprises orange to violet cationic azo dyes of the formula:

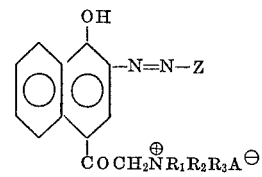

wherein $R_1$ is alkyl
$R_2$ and $R_3$ are independently alkyl or hydroxyalkyl, or together form an alicyclic ring
$A^\ominus$ is a water-solubilizing anion and
Z is the radical of a diazo compound of the carbocyclic or heterocyclic aromatic series, free of sulfonic or carboxylic acid groups.

Also included in this invention is the naphthol coupler utilized in preparation of these dyes and having the structure:

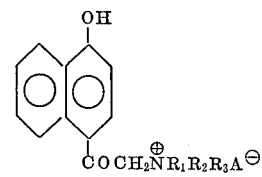

where $R_1$ is alkyl; $R_2$ and $R_3$ are independently alkyl or hydroxyalkyl, or together form an alicyclic ring; A is an anion; and $R_1$, $R_2$ and $R_3$ are preferably $C_{1-2}$.

DESCRIPTION OF THE INVENTION

The structure given above is a generic description of the novel dyes of the present invention. Within this generic classification, dyes of the formula

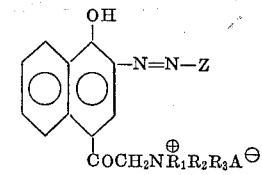

where
$R_1$ is alkyl; $R_2$ and $R_3$ are independently alkyl or hydroxyalkyl, or together form an alicyclic ring; $A^\ominus$ is a water-solubilizing anion; Z is phenyl ring, or a phenyl ring substituted with 1–3 of the following groups: alkyl, alkoxy, hydroxyalkyl, acetamido, benzamido, benzenesulfonamido, alkoxycarbonyl, alkylcarbonyl, alkylsulfonyl, phenylcarbonyl, sulfonamide, N-alkylsulfonamide, trifluoromethyl, nitro, cyano, chloro, bromo, phenoxy or alkylamino, or Z is an α-naphthylamino radical, or a 2-(p-aminophenyl)benezothiazolo radical optionally substituted with alkyl in the benzo ring, or the radical of 1-(p-aminophenyl)-3-methylbenzopyrazole optionally substituted with alkyl or alkoxy in the benzo ring, or Z is

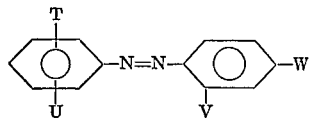

wherein

T and U are independently H, methyl or methoxy
V is H, alkyl, alkoxycarbonyl or halogen
W is H, $NO_2$ or CN, constitute a preferred dye range.

All alkyl and alkoxy groups present in the formula above whether present in $R_1$, $R_2$, $R_3$ and/or Z are preferably $C_{1-2}$.

The preferred limits on the scope of $R_1$ to $R_3$ are imposed by the increasing difficulty in preparing the coupler as the size of the groups increase. The preferred restriction on the number of carbon atoms in the alkyl and alkoxy groups of Z reflects an anticipation of decreased solubility, reserve and economic benefit as the chain length increases.

Many dyes falling within the bounds of the present invention have the general structure:

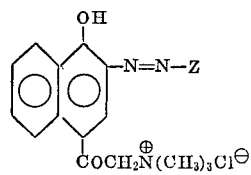

where Z is for example:

(1) —⟨O⟩  $\lambda_{max}$. 493 mμ; orange (2) —⟨O⟩—N=N—⟨O⟩  $\lambda_{max}$. 519 mμ; bluish-red (3) NO₂—⟨O⟩—NO₂  $\lambda_{max}$. 490 mμ; orange (4) CH₃O  Cl
—⟨O⟩—N=N—⟨O⟩—NO₂  $\lambda_{max}$. 576 mμ; violet
OCH₃

(5) —⟨O⟩—Cl  $\lambda_{max}$. 496 mμ; orange (6) CH₃O
—⟨O⟩  $\lambda_{max}$. 518 mμ; red
CH₃

(7) CH₃O
—⟨O⟩—NO₂  $\lambda_{max}$. 517 mμ; red

In the general structure given above for these examples, the water solubilizing anion is shown as chloride, this being the preferred anion for convenience and economy although these compounds could readily be isolated as $ZnCl_3^{\ominus}$ salts. Substitution of other anions such as bromide, iodide, methosulfate, picrate, chlorate, acetate or aryl sulfonate would be expected to alter only the physical form, solubility and economics of the dyes.

The dyes of this invention are prepared by adding the diazonium salt of a diazotized arylamine to a cooled alkaline solution of a naphthol coupler, which may be prepared as in Example I, and having the formula:

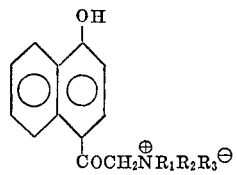

where $R_1$ is $C_{1-2}$ alkyl; $R_2$ and $R_3$ are independently $C_{1-2}$ alkyl or hydroxyalkyl, or together form an alicyclic ring; and $A^{\ominus}$ is a water-solubilizing anion.

As is well known in the art, the optimum procedure for diazotizing an arylamine varies according to the solubility characteristics of the molecule and the reactivity of the amine group, both of which are a function of the ring structure and the other substituents on the ring (or rings).

Diazotization is most commonly carried out in dilute hydrochloric or sulfuric acid with sodium nitrite at temperatures of 0°–60° C., depending on the amine. In some cases, an organic solvent such as acetic or propionic acid is added to solubilize the amine, particularly in the case of substituted aminoazobenzenes. In other instances, where nitrous acid is ineffective, diazotization is carried out in nitrosylsulfuric acid.

The following examples are intended to be merely illustrative of the invention and not in limitation thereof. Unless otherwise indicated, all quantities are by weight.

EXAMPLE I

Preparation of α-(4-hydroxy-1-naphthacyl)trimethyl ammonium chloride (a) α-Naphthol (144 g., 1.0 mole) and chloroacetonitrile (151 g., 2.0 moles) were dissolved in monochlorobenzene (MCB) (2l.). Anhydrous aluminum chloride (146.6 g., 1.1 moles) was added in small portions over 15 minutes at 25°–35° C. The resulting thick brown slurry was cooled to 25° C. and hydrogen chloride gas bubbled into the reaction mixture for 12 hours at 25°–30° C. After stirring for a further 6 hours at room temperature, the thick, yellow reaction mass was drowned in water at 50°–60° C. and slowly heated to 100° C. This temperature was maintained until the 4-chloroacetyl-1-naphthol had dissolved in the MCB (ca. ½ hour), after which the mixture was allowed to cool without stirring to room temperature. The chloro compound crystallized from the upper (MCB) layer as thick, white plates. These were filtered off, washed thoroughly with MCB and dried. The material, M.P. 181–183° C. was obtained in greater than 90% yield and was shown by thin layer chromatography to be free of unreacted α-naphthol.

Found (percent): C, 65.2, 65.3; H, 3.9, 3.9; Cl, 15.9, 16.0. Calcd. for $C_{12}ClH_9O_2$ (percent): C, 65.0; H, 4.1; Cl, 16.1.

The structure was confirmed by NMR and IR Spectroscopy.

(b) 4-chloroacetyl-1-naphthol (70.6 g., 0.32 mole) was slurried in anhydrous methanol (300 ml.) and a 25% solution of trimethylamine in methanol (300 ml.) was added over a period of 15 minutes. The temperature rose to 45° C. The reaction mixture was heated to reflux for 6 hours and then allowed to cool to room temperature. The deep yellow solution was diluted with MCB (400 ml.) and the methanol removed under reduced pressure. The yellow product, which precipitated, was filtered off, washed with MCB and dried under reduced pressure at 80° C. The yellow crystalline product, M.P. 229°–230° C., was obtained in 99% yield and was shown by thin layer chromatography to be of high purity. (methylethyl ketone: water=10:1 as eluent. Plate developed with p-nitroaniline diazo spray).

Found (percent): N, 5.3, 5.4; Cl, 12.6, 12.8. Calc. for $C_{15}ClH_{18}NO_2$ (percent): N, 5.0; Cl, 12.7.

The coupler prepared by the above procedure has the following structure:

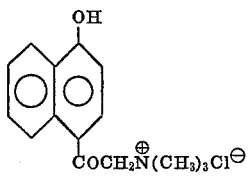

EXAMPLE II

Coupling of aniline to α-(4-hydroxy-1-naphthacyl) trimethylammonium chloride

A solution of aniline (46.5 g., 0.5 mole) in water (400 ml.) and 10 N-hydrochloric acid (150 ml., 1.5 moles) was cooled externally to 0°–5° C. 5 N-sodium nitrite (104 ml., 0.52 mole) was added rapidly while maintaining the temperature at 0°–5° C. A positive nitrite test was maintained for ½ hour, after which excess nitrite was destroyed with sulfamic acid.

The cold benzene diazonium chloride solution was added over a period of 1 hour to a solution of α-(4-hydroxy-1-naphthacyl)trimethylammonium chloride (140 g., 0.5 mole) in 2 N-sodium carbonate solution (500 ml., 0.5 mole) and water (500 ml.) that had been pre-cooled to 0°–5° C. After stirring for a further ½ hour, the pH was adjusted to 5.0 with concentrated hydrochloric acid and the mixture stirred overnight at room temperature. The dye was filtered off, washed with 10% brine (1.5 l.) and dried in vacuo at 60° C. Thin layer chromatography (methyl ethyl ketone:water=10:1 as eluent) indicated one orange component in the solids. Azo nitrogen analysis indicated a purity of 90%. The yield was 92% of theory.

The structure of the dye is as follows:

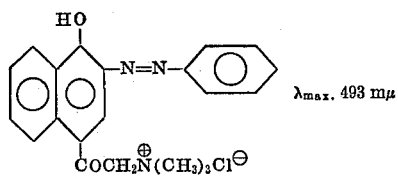

It dyes acrylic fiber and acid-modified polyester and polyamide fibers bright orange shades and Xenon Arc Fade-Ometer tests showed good fastness to light. A dye of similar shade and fastness is obtained starting with α-(4-hydroxy - 1 - naphthacyl)dimethyl(2 - hydroxyethyl) ammonium chloride.

EXAMPLE III

Coupling of aminoazobenzene to α-(4-hydroxy-1-naphthacyl)trimethylammonium chloride p-Aminoazobenzene hydrochloride (117 g., 0.5 mole) was slurried in water (1400 ml.) and 10 N–HCl (120.0 ml., 1.2 moles) at 20° C. 5 N-Sodium nitrite (120 ml., 0.6 mole) was added over 20 minutes and the reaction mixture stirred for another 10 minutes at 20°–25° C. Excess nitrite was then destroyed with sulfamic acid and the diazonium salt preparation cooled to 0°–5° C.

The coupling procedure and isolation of the dye was similar to the description in Example I. Thin layer chromatography indicated one red component in the solids. Azo nitrogen analysis indicated a purity of 88%. The yield was 72.5% of theory.

The structure of the dye is as follows:

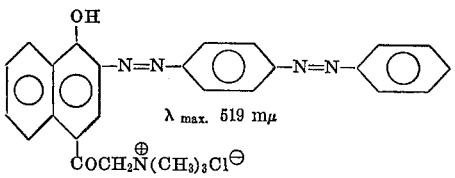

It dyes acrylic and acid-modified polyester fiber bluish-red shades and Xenon Arc Fade-Ometer tests showed good fastness to light. A dye of similar shade and fastness is obtained from α-(4-hydroxy-1-naphthacyl)diethyl (2-hydroxyethyl)ammonium chloride.

EXAMPLE IV

Coupling of 2,4-dinitroaniline to α-(4-hydroxy-1-naphthacyl)trimethylammonium chloride Powdered sodium nitrite (2.1 g., 0.03 mole) was added in small portions to 98% sulfuric acid (25 ml.) at 25°–30° C. The mixture was then heated carefully to 60° C. and held at this temperature until the solid had dissolved. The solution was cooled to 20° C. and 2,4-dinitroaniline (4.6 g., 0.025 mole) was added in small portions at 20°–25° C. The resulting viscous solution was stirred at 20°–25° C. for 1 hour and then drowned in ice water (200 g.). Excess nitrous acid was destroyed with urea and charcoal (2 g.) and Supercell (2 g.) were added. The mixture was filtered. The resulting diazo solution was added over a period of 30 minutes to a solution of α-(4-hydroxy-1 - naphthacyl)trimethylammonium chloride (7.0 g., 0.025 mole) in 2 N-sodium carbonate solution (250 ml., 0.25 mole) and water (100 ml.) at 0°–5° C. The mixture was stirred for 2 hours, during which time the temperature was allowed to rise to 20° C. The pH was then adjusted from 7.5 to 5.5 with concentrated hydrochloric acid and the suspension filtered, washed with water and dried at 65° C. in vacuo.

The resulting solid (11.5 g.) had the structure:

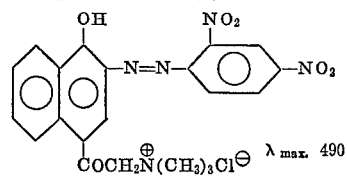

The dye gives orange shades on acrylic fiber and Xenon Arc Fade-Ometer tests showed fair fastness to light. It has good reserve on cotton.

Other dyes that were prepared by the above method are:

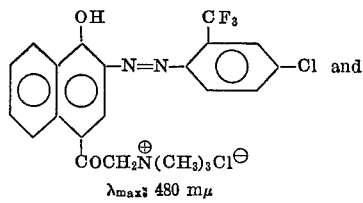

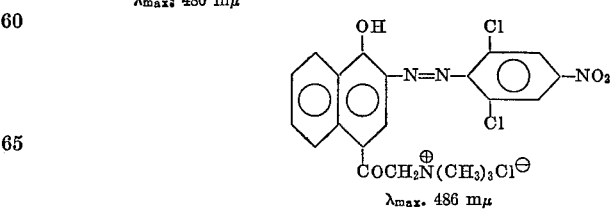

EXAMPLE V

Coupling of 4-amino-2,5-dimethoxy-2'-chloro - 4' - nitro-azobenzene to α-(4-hydroxy - 1 - naphthacyl)trimethyl-ammonium chloride.

Concentrated hydrochloric acid (7.5 ml., 0.09 mole) was added to a slurry of the title aminoazobenzene derivative (10.1 g., 0.03 mole) in glacial acetic acid (30 ml.) and water (80 ml.). After stirring the mixture for 30 minutes, 5 N-sodium nitrite solution (9 ml., 0.045 mole) was added dropwise over a 15 minute period at 25° C. After stirring for a further 30 minutes, excess nitrous acid was destroyed with sulfamic acid. Charcoal (2 g.) and Supercell (2 g.) were added and the mixture filtered.

The resulting diazo solution was added rapidly to a solution of α-(4-hydroxy-1 - naphthacyl)trimethylammonium chloride (8.4 g., 0.03 mole) and sodium acetate (22.6 g.) in water (150 ml.) at 0°–5° C. The resulting mixture was stirred at 25° C. for 4 hours, by which time coupling was complete. The dye was filtered off, washed with water and dried in vacuo at 65° C.

The resulting dark blue solid (20.4 g.) had the following structure:

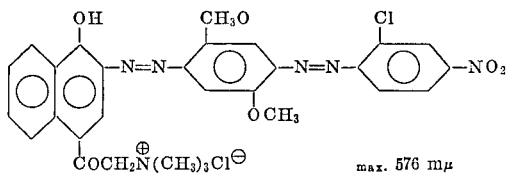
max. 576 mμ

It gives violet shades on acrylic fiber and blue shades on acid-modified polyester. Xenon Arc Fade-Ometer tests showed good fastness to light on these fibers. Other dyes prepared by the above method are::

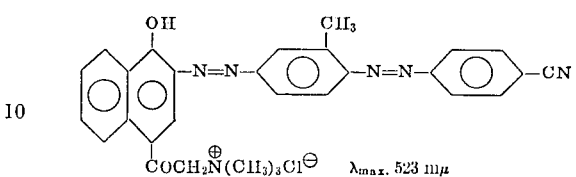
$\lambda_{max.}$ 523 mμ

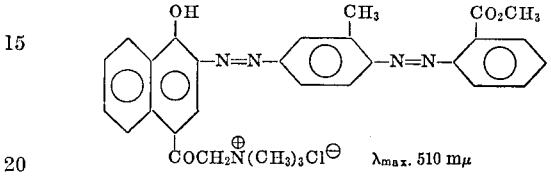
$\lambda_{max.}$ 510 mμ

These dyes give red and yellowish red shades, respectively, on acrylic and acid-modified polyester and have good light-fastness on both fibers.

Other dyes of this invention are exemplified in Table I.

TABLE I

Dyes of the structure

| Z | $\lambda_{max.}$ (mμ) (50:50 water:ethanol) | Shade |
|---|---|---|
| (1) 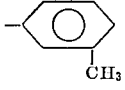 | 496 | Orange. |
| (2) 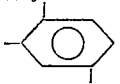 | 518 | Red. |
| (3) 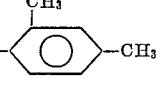 | 515 | Red. |
| (4) 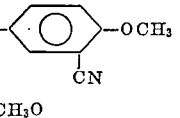 | 494 | Orange. |
| (5) 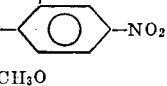 | 495 | Do. |
| (6) 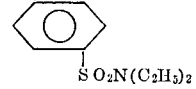 | 517 | Red. |
| (7) 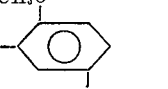 | 507 | Scarlet. |
| (8) | 508 | Do. |

TABLE I.—Continued
| Z | | λ_max. (mμ) (50:50 water:ethanol) | Shade |
|---|---|---|---|
| (9) | 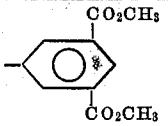 | 493 | Orange. |
| (10) | 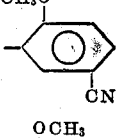 | 506 | Scarlet. |
| (11) | 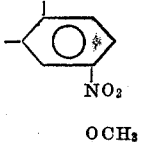 | 503 | Do. |
| (12) | 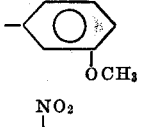 | 498 | Reddish-orange. |
| (13) |  | 508 | Scarlet. |
| (14) | 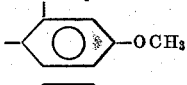 | 530 | Bluish red. |
| (15) |  | 496 | Reddish-orange. |
| (16) |  | 500 | Orange. |
| (17) | 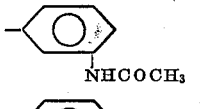 | 494 | Do. |
| (18) | 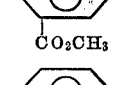 | 493 | Do. |
| (19) | 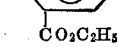 | 493 | Do. |
| (20) |  | 505 | Scarlet. |
| (21) |  | 494 | Orange. |
| (22) | 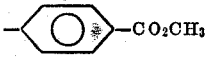 | 496 | Do. |
| (23) | 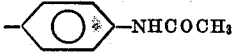 | 512 | Red. |
| (24) |  | 503 | Reddish-orange. |
| (25) | 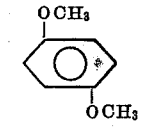 | 523 | Bluish-red. |
| (26) | 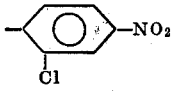 | 505 | Reddish-orange. |

TABLE I.—Continued

| Z | λ_max. (mμ) (50:50 water:ethanol) | Shade |
|---|---|---|
| (27) 2,4-dichlorophenyl | 494 | Orange. |
| (28) 2-methyl-4-methoxyphenyl | 518 | Red. |
| (29) 2-methyl-4-nitrophenyl | 505 | Scarlet. |
| (30) 2-chloro-4-methoxyphenyl | 512 | Red. |
| (31) 3-nitro-4-methoxyphenyl | 520 | Bluish-red. |
| (32) 2-(hydroxymethyl)phenyl | 494 | Orange. |
| (33) 4-ethoxyphenyl | 505 | Scarlet. |
| (34) 2,6-diethoxy-4-(acetylamino)phenyl | 558 | Violet. |
| (35) 2,6-dimethoxy-4-(benzoylamino)phenyl | 553 | Do. |
| (36) 4-phenoxyphenyl | 504 | Scarlet. |
| (37) 4-benzoylphenyl | 502 | Do. |
| (38) 4-(benzoylamino)phenyl | 513 | Red. |
| (39) 3-methoxy-4-(phenylsulfonylamino)phenyl | 517 | Do. |
| (40) 3-diethylamino-4-methoxyphenyl | 502 | Dull red. |
| (41) naphthyl | 506 | Scarlet. |
| (42) 6-methylbenzothiazol-2-yl-phenyl | 514 | Red. |
| (43) 3-methyl-1-(4-methoxyphenyl)pyrazol-yl | 507 | Do. |

TABLE I.—Continued

| Z | λmax. (mμ) (50:50 water:ethanol) | Shade |
|---|---|---|
| (44) 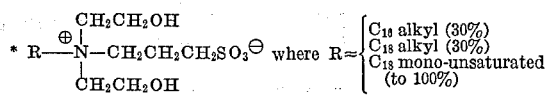 | 526 | Bluish red. |

Dyeing procedures for acid-modified acrylic, polyamide and polyester fibers appear below.

EXAMPLE VI

Dyeing of acid-modified acrylic fiber (a) PREPARATION OF FIBER

A 5-gram skein of acid-modified acrylic fiber was scoured for 15 minutes at 160° F. in a 200 ml. aqueous bath containing

| | Gram |
|---|---|
| Tetrasodium pyrophosphate | 0.05 |
| The condensation product of 20 moles of ethylene oxide with one mole of $C_{18}$ alcohol | 0.05 |

The skein was rinsed thoroughly with water.

(b) DYEING PROCEDURE

A 200-ml. aqueous dyebath was prepared which contained the following:

| | Gram |
|---|---|
| Dye | 0.025 |
| The condensation product of 20 moles of ethylene oxide with 1 mole of $C_{18}$ alcohol | 0.025 |
| Sodium sulfate (anhydrous) | 0.500 |
| $C_{12-16}$ alkyl trimethylammonium bromide | 0.250 |
| Glacial acetic acid | 0.050 |

The 5-gram skein was added and the temperature raised to boiling for 1–2 hours. The skein was rinsed in water, scoured for 15 minutes at 160° F. with 200 ml. of water containing 0.05 gram of the condensation product of 20 moles of ethylene oxide with 1 mole of $C_{18}$ alcohol, rinsed and dried.

EXAMPLE VII

Dyeing of acid-modified nylon (a) PREPARATION OF FIBER

A 5-gram skein of acid-modified nylon was scoured for 15 minutes at 160° F. in a 200 ml. aqueous bath containing

| | Gram |
|---|---|
| Sodium perborate | 0.20 |
| A sulfobetaine * | 0.006 |
| Trisodium phosphate | 0.013 |

$$* \ R\overset{\oplus}{\underset{|}{-}}\!\!\!\underset{CH_2CH_2OH}{\overset{CH_2CH_2OH}{N}}\!\!\!-CH_2CH_2CH_2SO_3^{\ominus} \ \text{where} \ R \approx \begin{cases} C_{16} \text{ alkyl (30\%)} \\ C_{18} \text{ alkyl (30\%)} \\ C_{18} \text{ mono-unsaturated} \\ \text{(to 100\%)} \end{cases}$$

The skein was rinsed thoroughly in water.

(b) DYEING PROCEDURE

The 5-gram skein was added to a 200 ml. aqueous dyebath containing:

| | Gram |
|---|---|
| The aforementioned sulfobetaine | 0.050 |
| The tetrasodium salt of ethylenediamine tetraacetic acid | 0.013 |
| Tetrasodium pyrophosphate | 0.050 |

The dyebath pH was adjusted to 6 with monosodium phosphate and the temperature raised to 80° F. for 10 minutes. The dye (0.025 gram) was added and the dyebath held at 80° F. for an additional 15 minutes. The temperature was then raised at a rate of 2° F. per minute to 208° F. This temperature was maintained for 1 hour. The skein was rinsed in water and dried.

EXAMPLE VIII

Dyeing of acid-modified polyester (a) PREPARATION OF FIBER

A 5 g. swatch of acid-modified polyester was scoured for 30 minutes at 160° F. in a 200 ml. aqueous bath containing

| | Gram |
|---|---|
| The condensation product of 20 moles of ethylene oxide with one mole of $C_{18}$ alcohol | 0.30 |
| Tetrasodium pyrophosphate | 0.30 |

The swatch was rinsed thoroughly with water.

(b) DYEING PROCEDURE

The 5 g. swatch was placed in a 200 ml. aqueous dyebath containing

| | Gram |
|---|---|
| The condensation product of 20 moles of ethylene oxide with one mole of $C_{18}$ alcohol | 0.10 |

The bath was run for 10 minutes at 130° F. The dye (0.025 gram) was added and the bath was run for an additional 10 minutes. The pH was adjusted to 4.0–4.5 with acetic acid and the temperature raised to 160° F. Next a modified biphenyl derivative (1.0 gram) was added. The temperature was raised to boiling and the bath run at 210°–212° C. for 1½ hours. The swatch was rinsed and dried.

The dyes of this invention may be used to dye acid-modified synthetic fibers and are particularly useful on acrylic fiber, having in general bright shades and good fastness to light on this fiber. They also have good dyebath stability in the pH range 2–7, within which range all three of the acid-modified fibers seen in Examples VI–VIII, may be dyed.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Orange to violet cationic dyes of the formula

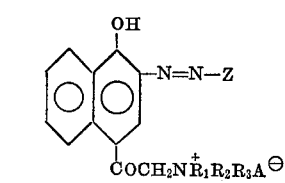

wherein $R_1$ is alkyl; $R_2$ and $R_3$ are independently alkyl or hydroxyalkyl; $A^{\ominus}$ is a water solubilizing anion; Z is the radical of a diazo compound of the carbocyclic aromatic series, free of sulfonic and carboxylic acid groups and is selected from:

(a) a phenyl ring which can be substituted with 1–3 groups selected from alkyl, alkoxy, hydroxyalkyl, acetamido, benzamido, benzenesulfamido, alkoxycarbonyl, alkylcarbonyl, alkylsulfonyl, phenylcarbonyl, sulfonamide, N-alkylsulfonamide, trifluoromethyl, nitro, cyano, chloro, bromo, phenoxy and alkylamino; and

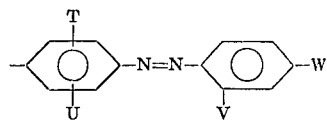

wherein
T and U are independently H, methyl, or methoxy,
V is H, alkoxycarbonyl, chlorine or bromine, and
W is H, $NO_2$ or CN, and
wherein all alkyl and alkoxy groups are $C_{1-2}$.

2. A dye according to claim 1 having the formula:

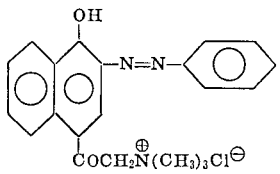

3. A dye according to claim 1 having the formula:

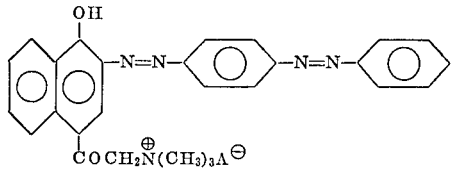

4. A dye according to claim 1 having the formula:

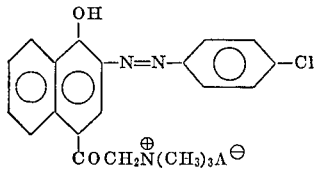

5. A dye according to claim 1 having the formula:

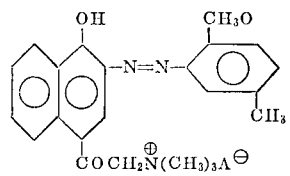

6. A dye according to claim 1 having the formula:

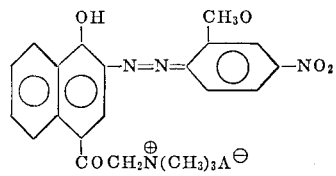

References Cited
UNITED STATES PATENTS

| | | | |
|---|---|---|---|
| 2,281,526 | 1/1958 | Boyd | 260—205 |
| 3,020,272 | 2/1962 | Sartori | 260—186 |
| 3,074,926 | 1/1963 | Sartori | 260—191 |
| 3,119,810 | 1/1964 | Sartori | 260—163 |

FOREIGN PATENTS

| | | | |
|---|---|---|---|
| 1,516,080 | 1/1968 | France | 260—163 |

LEWIS GOTTS, Primary Examiner

D. M. PAPUGA, Assistant Examiner

U.S. Cl. X.R.

260—146 R, 158, 162, 194, 202, 204, 429.9, 567.6 M; 8—179